Patented Feb. 25, 1947

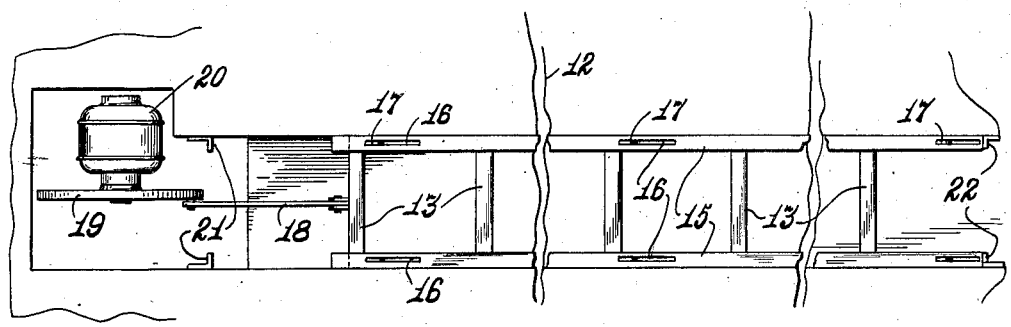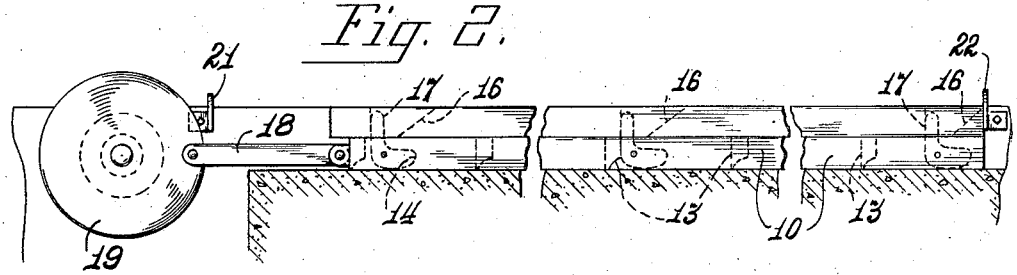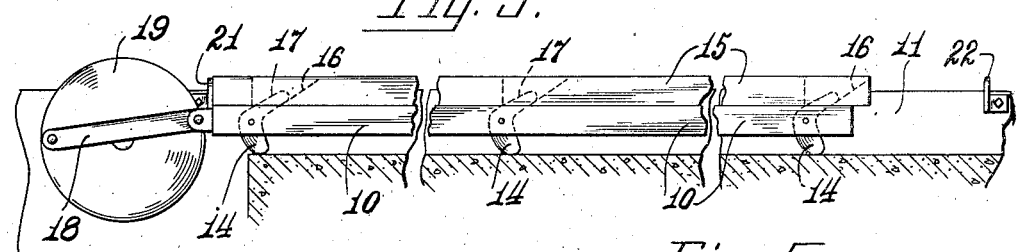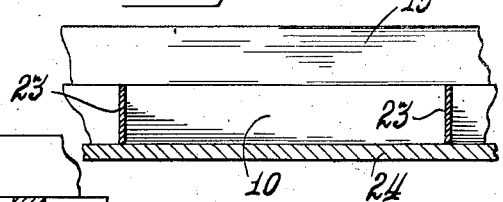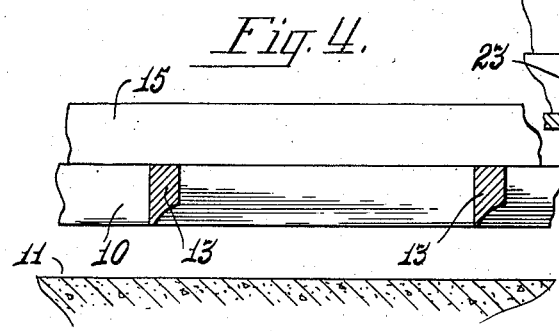

2,416,469

UNITED STATES PATENT OFFICE 2,416,469

RECIPROCATING CONVEYER DUNG REMOVER

Nat Cordis, Bassett, Wis.

Application February 8, 1944, Serial No. 521,577

3 Claims. (Cl. 198—224)

The invention relates to improvements in dung removers especially adapted for use in dairy barns, chicken coops and the like, and has for its primary object the provision of a simple device of the character indicated which is capable of economical production and highly efficient in use.

Other objects will appear hereinafter.

The invention consists of the combinations and arrangements of parts hereinafter described and claimed.

The invention will be best understood by reference to the accompanying drawing in which—

Fig. 1 is a partial top plan view of apparatus embodying the invention;

Fig. 2, a longitudinal view of the same;

Fig. 3, a view similar to Fig. 2 but showing the positions assumed by the parts upon retrograde movements thereof;

Fig. 4, a transverse section taken substantially on line 4—4 of Fig. 3, and

Fig. 5, a partial longitudinal section illustrating a modified form of scraper member.

The embodiment of the invention illustrated in Figs. 1, 2, 3 and 4 comprises a rectangular frame 10 arranged as indicated to reciprocate in the ordinary dung trough 11 at the rear of the stalls 12 of a dairy barn. The frame 10 is provided with a plurality of spaced transverse scraper bars 13 and a plurality of oscillatory eccentric riders 14 pivotally mounted in the side bars of the frame 10. Reciprocating operating bars 15 are arranged as indicated over the side bars of the frame 10 and provided with slots 16 arranged to engage the upwardly extending operating arms 17 of the eccentrics 14 to cause operation of said eccentrics. The frame 10 is operatively connected by means of a link 18 with a crank pin on the revolving face plate 19 arranged to be slowly rotated by means of a motor 20. Stops 21 and 22 are arranged as indicated at the front and rear of the operating bars 15 so as to contact therewith at the ends of the reciprocations of frame 10. By this arrangement as the face plate 19 is slowly rotated, the scraper frame 10 will be caused to reciprocate in the trough 11. At the end of the forward movement of said frame the forward ends of the operating bars 15 contact with the stops 21, thereby forcing said operating bars rearwardly with relation to the frame 10, thus causing simultaneous rotations of the eccentric riders 14 into the positions indicated in Fig. 3 and whereby said scraper frame 10 is elevated so as to withdraw the scraper bars 13 from contact with the bottom of the trough 11, and whereby said scraper bars will be caused to pass rearwardly over the material in said trough, as will be readily understood. At the end of the rearward movement of the frame 10 and bars 15 the rear ends of said bars contact with the stops 22, thus simultaneously oscillating the eccentrics 14 to cause return of the scraper bars 13 into operative scraping relation with the bottom of the trough 11, thereby again moving the material in said trough forwardly for passage therefrom. In this way material deposited in said trough may be readily removed therefrom by operating the motor 20 briefly.

In the modification illustrated in Fig. 5 a scraper frame 10 is shown equipped with comparatively narrow blades 23 arranged to move material from the drop board 24 of an ordinary chicken coop substantially in the same manner as already described for the dairy barn.

While I have illustrated and described the preferred forms of construction for carrying the invention into effect, these are capable of variation and modification without departing from the spirit of the invention. I therefore do not wish to be limited to the precise details disclosed, but desire to avail myself of such variations and modifications as fall within the scope of the appended claims.

I claim:

1. A conveyor having a material-receiving surface; a reciprocatory frame arranged over said surface and provided with a plurality of spaced rigid scraper elements; means carried by and depending from said frame arranged to contact with said surface to elevate said frame upon reciprocation in one direction and lower said frame upon reverse movement thereof; and means for reciprocating said frame.

2. The construction specified in claim 1 in which the frame elevating means consists of a plurality of depending oscillatory eccentric riders on said frame in contact with said surface and arranged to elevate the frame upon reciprocation in one direction and lower it upon reverse movement.

3. The construction specified in claim 1 in which the frame is elevated and lowered by means of oscillatory eccentrics, and a reciprocatory bar is operatively connected with said eccentrics to cause simultaneous operations thereof, and stop members are arranged to engage the ends of said bar and operate the same at the end of each reciprocation of said member.

NAT CORDIS.

REFERENCES CITED

The following references are of record in the file of this patent:

UNITED STATES PATENTS

| Number | Name | Date |
|---|---|---|
| 673,360 | Dequede | Apr. 30, 1901 |
| 1,039,785 | Nevill | Oct. 1, 1912 |
| 1,199,580 | Lowden | Sept. 26, 1916 |
| 1,927,625 | Baumann | Sept. 19, 1933 |

FOREIGN PATENTS

| Number | Country | Date |
|---|---|---|
| 391,935 | Great Britain | May 11, 1933 |